United States Patent
Park et al.

(10) Patent No.: US 12,515,078 B2
(45) Date of Patent: Jan. 6, 2026

(54) TRANSDUCER FOR FACILITATING WASTE CLEARANCE OF THE BRAIN LYMPHATIC SYSTEM AND CONTROL METHOD THEREOF

(71) Applicant: DEEPSONBIO CO., LTD., Seongnam-si (KR)

(72) Inventors: Woong Park, Seoul (KR); Gujin Chung, Seongnam-si (KR)

(73) Assignee: DEEPSONBIO CO., LTD., Seongnam-si (KR)

( * ) Notice: Subject to any disclaimer, the term of this patent is extended or adjusted under 35 U.S.C. 154(b) by 197 days.

(21) Appl. No.: 18/079,228

(22) Filed: Dec. 12, 2022

(65) Prior Publication Data

US 2023/0181934 A1 Jun. 15, 2023

(30) Foreign Application Priority Data

Dec. 10, 2021 (KR) .......................... 10-2021-0176412

(51) Int. Cl.
*A61N 7/00* (2006.01)
*B06B 1/02* (2006.01)
(Continued)

(52) U.S. Cl.
CPC .............. *A61N 7/00* (2013.01); *B06B 1/0215* (2013.01); *B06B 1/0622* (2013.01); *B06B 1/067* (2013.01);
(Continued)

(58) Field of Classification Search
CPC .............. A61N 7/00; A61N 2007/0021; A61N 2007/006; A61N 2007/0073;
(Continued)

(56) References Cited

U.S. PATENT DOCUMENTS 5,722,412 A * 3/1998 Pflugrath ............. G10K 11/345
600/459
5,840,032 A * 11/1998 Hatfield .............. G01S 7/52085
348/E13.064
(Continued)

FOREIGN PATENT DOCUMENTS

| JP | 2005-340903 A | 12/2005 |
|---|---|---|
| KR | 10-1143645 B1 | 5/2012 |
| KR | 10-2256266 B1 | 5/2021 |

OTHER PUBLICATIONS

Engelhardt, B., P. Vajkoczy, and R.O. Weller, The movers and shapers in immune privilege of the CNS. Nat Immunol, 2017. 18(2): p. 123-131.
(Continued)

*Primary Examiner* — Sanjay Cattungal
(74) *Attorney, Agent, or Firm* — NKL Law; Jae Youn Kim

(57) ABSTRACT

The present disclosure relates to an ultrasound transducer and a control method thereof. More particularly, the present disclosure is related to an ultrasound transducer for facilitating waste clearance of the brain lymphatic system and a control method thereof. A transducer according to the present disclosure includes: an oscillator including a plurality of Piezoelectric materials, and a polymer encompassing the plurality of Piezoelectric materials, and irradiating an ultrasound using at least one of the plurality of Piezoelectric materials and the polymer; a lens having a first space where at least a part of the oscillator is inserted, and focuses the applied ultrasound; and a housing supporting connection between the oscillator and the lens, wherein a height of the oscillator is longer than a height of the first space, a first height difference between the height of the oscillator and the height of the first space is inverse proportion to overall
(Continued)

height of the lens, and a width of the oscillator is smaller than a width of the first space.

14 Claims, 13 Drawing Sheets

(51) Int. Cl.
  *B06B 1/06* (2006.01)
  *H10N 30/85* (2023.01)
  *H10N 30/88* (2023.01)

(52) U.S. Cl.
  CPC ......... *H10N 30/852* (2023.02); *H10N 30/883* (2023.02); *A61N 2007/0021* (2013.01); *A61N 2007/006* (2013.01); *B06B 2201/76* (2013.01)

(58) Field of Classification Search
  CPC .... A61N 2007/0026; A61N 2007/0056; A61N 2007/0078; A61N 2007/0095; B06B 1/0215; B06B 1/0622; B06B 1/067; B06B 2201/76; B06B 1/0637; B06B 1/0607; H10N 30/852; H10N 30/883; G10K 11/30; A61B 8/4209; A61B 8/4281
  See application file for complete search history.

(56) References Cited

U.S. PATENT DOCUMENTS

| | | | | |
|---|---|---|---|---|
| 5,964,708 | A * | 10/1999 | Freeman | G01S 7/52028 600/447 |
| 6,013,032 | A * | 1/2000 | Savord | G01S 15/8927 600/443 |
| 6,089,096 | A * | 7/2000 | Alexandru | G01S 15/8925 73/625 |
| 6,224,556 | B1 | 5/2001 | Schwartz | G01S 15/895 600/447 |
| 6,482,160 | B1 * | 11/2002 | Stergiopoulos | G01S 7/52046 600/443 |
| 6,552,964 | B2 * | 4/2003 | Chiang | G01S 7/52085 367/138 |
| 6,705,995 | B1 * | 3/2004 | Poland | G10K 11/346 600/447 |
| 6,716,174 | B1 * | 4/2004 | Li | G01S 15/8925 600/447 |
| 6,721,235 | B2 * | 4/2004 | Chiang | H01Q 3/2682 367/138 |
| 6,867,720 | B1 * | 3/2005 | Freeman | G01S 7/5208 341/172 |
| 8,257,260 | B2 * | 9/2012 | Savord | G01S 7/52017 600/443 |
| 2002/0183618 | A1 * | 12/2002 | Hwang | G01S 7/52093 600/443 |
| 2003/0067249 | A1 * | 4/2003 | Lockwood | B06B 1/0622 310/324 |
| 2003/0163046 | A1 * | 8/2003 | Nohara | G01S 15/8927 600/443 |
| 2005/0090745 | A1 * | 4/2005 | Steen | A61B 8/483 600/447 |
| 2005/0110793 | A1 * | 5/2005 | Steen | G06T 15/08 345/536 |
| 2005/0243812 | A1 * | 11/2005 | Phelps | G10K 11/346 370/360 |
| 2008/0009739 | A1 * | 1/2008 | Chiang | G01S 7/5208 600/459 |
| 2008/0262351 | A1 * | 10/2008 | Scampini | A61B 8/4483 600/443 |
| 2009/0030313 | A1 * | 1/2009 | Prater | A61B 8/54 600/443 |
| 2010/0160784 | A1 * | 6/2010 | Poland | A61B 8/4444 600/459 |
| 2010/0160785 | A1 * | 6/2010 | Poland | G01S 7/5208 600/459 |
| 2010/0160786 | A1 * | 6/2010 | Nordgren | A61B 8/00 600/459 |
| 2010/0168576 | A1 * | 7/2010 | Poland | G01S 7/5208 600/443 |
| 2010/0277305 | A1 * | 11/2010 | Garner | A61B 8/4438 340/539.1 |
| 2012/0016243 | A1 * | 1/2012 | Brown | G10K 11/346 600/472 |
| 2013/0165005 | A1 * | 6/2013 | Berard-Andersen | C09J 7/21 528/10 |
| 2015/0018686 | A1 * | 1/2015 | Berard-Andersen | A61B 8/4444 428/355 R |
| 2018/0263604 | A1 * | 9/2018 | Manning | A61B 8/546 |
| 2021/0212661 | A1 * | 7/2021 | Valois | A61B 8/461 |
| 2022/0401068 | A1 * | 12/2022 | Treacey | A61B 8/4281 |
| 2023/0181934 | A1 * | 6/2023 | Park | H10N 30/852 601/2 |
| 2024/0225597 | A1 * | 7/2024 | Valois | A61B 8/4281 |
| 2024/0307033 | A1 * | 9/2024 | Maciá Barber | A61B 8/4461 |

OTHER PUBLICATIONS

Meyer, C., G. Martin-Blondel, and R.S. Liblau, Endothelial cells and lymphatics at the interface between the immune and central nervous systems: implications for multiple sclerosis. Curr Opin Neurol, 2017. 30(3): p. 222-230.
Natale, G., G. Bocci, and D. Ribatti, Scholars and scientists in the history of the lymphatic system. J Anat, 2017. 231(3): p. 417-429.
Ahn, J.H., et al., Meningeal lymphatic vessels at the skull base drain cerebrospinal fluid. Nature, 2019. 572(7767): p. 62-66.
Abbott, N.J., et al., The role of brain barriers in fluid movement in the CNS: is there a 'glymphatic' system? Acta Neuropathol, 2018. 135(3): p. 387-407.
Jessen, N.A., et al., The Glymphatic System: A Beginner's Guide. Neurochem Res, 2015. 40(12): p. 2583-99.
Abbott, N.J. and I.A. Romero, Transporting therapeutics across the bloodbrain barrier. Mol Med Today, 1996. 2(3): p. 106-13.
Cammalleri, A., et al., Therapeutic Potentials of Localized Blood-Brain Barrier Disruption by Noninvasive Transcranial Focused Ultrasound: A Technical Review. J Clin Neurophysiol, 2020. 37(2): p. 104-117.
Muoio, V., P.B. Persson, and M.M. Sendeski, The neurovascular unit—concept review. Acta Physiol (Oxf), 2014. 210(4): p. 790-8.
Li, Q., et al., Aquaporin 1 and the Na(+)/K(+)/2Cl(−) cotransporter 1 are present in the leptomeningeal vasculature of the adult rodent central nervous system. Fluids Barriers CNS, 2020. 17(1): p. 15.
Iliff, J.J., et al., A paravascular pathway facilitates CSF flow through the brain parenchyma and the clearance of interstitial solutes, including amyloid beta. Sci Transl Med, 2012. 4(147): p. 147ra111.
Benveniste, H., et al., The Glymphatic System and Waste Clearance with Brain Aging: A Review. Gerontology, 2019. 65(2): p. 106-119.
Aspelund, A., et al., A dural lymphatic vascular system that drains brain interstitial fluid and macromolecules. J Exp Med, 2015. 212(7): p. 991-9.
Louveau, A., et al., Structural and functional features of central nervous system lymphatic vessels. Nature, 2015. 523(7560): p. 337-41.
Da Mesquita, S., et al., Functional aspects of meningeal lymphatics in ageing and Alzheimer's disease Nature, 2018. 560(7717): p. 185-191.
Da Mesquita, S., Z. Fu, and J. Kipnis, The Meningeal Lymphatic System: A New Player in Neurophysiology. Neuron, 2018. 100(2): p. 375-388.
Kress, B.T., et al., Impairment of paravascular clearance pathways in the aging brain. Ann Neurol, 2014 76(6): p. 845-61.
Cserr, H.F. and L.H. Ostrach, Bulk flow of interstitial fluid after intracranial injection of blue dextran 2000. Exp Neurol, 1974. 45(1): p. 50-60.
Cserr, H.F., D.N. Cooper, and T.H. Milhorat, Flow of cerebral interstitial fluid as indicated by the removal of extracellular markers from rat caudate nucleus. Exp Eye Res, 1977. 25 Suppl: p. 461-73.

(56) References Cited

OTHER PUBLICATIONS

Iliff, J.J., et al., Cerebral arterial pulsation drives paravascular CSF-interstitial fluid exchange in the murine brain. J Neurosci, 2013. 33(46): p. 18190-9.
Iliff, J.J., et al., Brain-wide pathway for waste clearance captured by contrastenhanced MRI. J Clin Invest, 2013. 123(3): p. 1299-309.
Fultz, N.E., et al., Coupled electrophysiological, hemodynamic, and cerebrospinal fluid oscillations in human sleep. Science, 2019. 366(6465): p. 628-631.
Yamada, S., et al., Influence of respiration on cerebrospinal fluid movement using magnetic resonance spin labeling. Fluids Barriers CNS, 2013. 10(1): p. 36.
Xie, L., et al., Sleep drives metabolite clearance from the adult brain. science, 2013. 342(6156): p. 373-377.
Benveniste, H., et al., Anesthesia with Dexmedetomidine and Low-dose Isoflurane Increases Solute Transport via the Glymphatic Pathway in Rat Brain When Compared with High-dose Isoflurane. Anesthesiology, 2017. 127(6): p. 976-988.
Lundgaard, I., et al., Glymphatic clearance controls state-dependent changes in brain lactate concentration. J Cereb Blood Flow Metab, 2017. 37(6): p. 2112-2124.
Gakuba, C., et al., General Anesthesia Inhibits the Activity of the "Glymphatic System". Theranostics, 2018. 8(3): p. 710-722.
Lee, H., et al., The Effect of Body Posture on Brain Glymphatic Transport. J Neurosci, 2015. 35(31): p. 11034-44.
Von Holstein-Rathlou, S., N.C. Petersen, and M. Nedergaard, Voluntary running enhances glymphatic influx in awake behaving, young mice. Neurosci Lett, 2018. 662: p. 253-258.
Smith, A.J., B.J. Jin, and A.S. Verkman, Muddying the water in brain edema? Trends Neurosci, 2015. 38(6): p. 331-2.
Smith, A.J., et al., Test of the 'glymphatic' hypothesis demonstrates diffusive and aquaporin-4-independent solute transport in rodent brain parenchyma. Elife, 2017. 6.
Holter, K.E., et al., Interstitial solute transport in 3D reconstructed neuropil occurs by diffusion rather than bulk flow. Proceedings of the National Academy of Sciences, 2017. 114(37): p. 9894-9899.
Pizzo, M.E., et al., Intrathecal antibody distribution in the rat brain: surface diffusion, perivascular transport and osmotic enhancement of delivery. J Physiol, 2018. 596(3): p. 445-475.
Papadopoulos, M.C., J.K. Kim, and A.S. Verkman, Extracellular space diffusion in central nervous system: anisotropic diffusion measured by elliptical surface photobleaching. Biophys J, 2005. 89(5): p. 3660-8.
Rosenberg, G.A., W.T. Kyner, and E. Estrada, Bulk flow of brain interstitial fluid under normal and hyperosmolar conditions. Am J Physiol, 1980. 238(1): p. F429.
Kiviniemi, V., et al., Ultra-fast magnetic resonance encephalography of physiological brain activity—Glymphatic pulsation mechanisms? J Cereb Blood Flow Metab, 2016. 36(6): p. 1033-45.
Eide, P.K., et al., Magnetic resonance imaging provides evidence of glymphatic drainage from human brain to cervical lymph nodes. Sci Rep, 2018. 8(1): p. 7194.
Ringstad, G., et al., Brain-wide glymphatic enhancement and clearance in humans assessed with MRI. JCI Insight, 2018. 3(13).
Meng, Y., et al., Glymphatics Visualization after Focused Ultrasound-Induced Blood-Brain Barrier Opening in Humans. Ann Neurol, 2019. 86(6): p. 975-980.
Wang, M., et al., Focal Solute Trapping and Global Glymphatic Pathway Impairment in a Murine Model of Multiple Microinfarcts. J Neurosci, 2017. 37(11): p. 2870-2877.
Pu, T., et al., Persistent Malfunction of Glymphatic and Meningeal Lymphatic Drainage in a Mouse Model of Subarachnoid Hemorrhage. Exp Neurobiol, 2019. 28(1): p. 104-118.
Iliff, J.J., et al., Impairment of glymphatic pathway function promotes tau pathology after traumatic brain injury. J Neurosci, 2014. 34(49): p. 16180-93.
Rasmussen, M.K., H. Mestre, and M. Nedergaard, The glymphatic pathway in neurological disorders. The Lancet Neurology, 2018. 17(11): p. 1016-1024.
Holth, J.K., et al., The sleep-wake cycle regulates brain interstitial fluid tau in mice and CSF tau in humans. Science, 2019. 363(6429): p. 880-884.

\* cited by examiner

700

| NUMBER | UI | DESCRIPTION | NOTE |
|---|---|---|---|
| 1 | Frequency | Ultrasound frequency of the device<br>Unchangeable by the user | |
| 2 | PL | Turn-on time of an inner pulse of an ultrasound generating signal<br>(Min.: 0.1ms to 1ms, changed by 1, Max: 1ms to 1000ms, changed by 1)<br>*Error range: ±5% | |
| 3 | Duty Cycle | Period ratio according to the turn-on time of an inner pulse of the ultrasound generating signal<br>(Min.: 0.1% to 1%, changed by 0.1, Max: 1% to 100%, changed by 1)<br>*Error range: ±5% | |
| 4 | BD | Turn-on time of an external pulse of an ultrasound generating signal<br>(Min.: 10ms, Max: 3000ms, changed by 1)<br>*Error range: ±5% | |
| 5 | BI | Period ratio according to the turn-on time of an external pulse of the ultrasound generating signal<br>(Min.: 10ms, Max: 7000ms, changed by 1)<br>*Error range: ±5% | |
| 6 | Total Time | Total time of operation<br>Adjusting times of use by using +, - buttons (by 1 within a range of 1min to 30min)<br>*Error range: ±10% | |
| 7 | Power | (RF board) output levels of the device<br>Adjusting levels by using , buttons(1-85)<br>*Error range: ±5% | |
| 8 | Memory | Storing respective parameter in preset states (M1, M2, M3, M4) | |
| 9 | Start / Stop | Starting/stopping ultrasound radiation<br>(no pause button provided) | |
| 10 | Intensity | output (W) and effective intensity (W/cm2) of the device<br>*Error range: ±20% (output), ±30% (effective intensity) | |
| 11 | Information | Detailed information of the device | |
| 12 | Handpiece Connection | Displaying connections between transducer modules | |
| 13 | CH-Status | Determining output forms of ultrasound | |

FIG. 13B

TRANSDUCER FOR FACILITATING WASTE CLEARANCE OF THE BRAIN LYMPHATIC SYSTEM AND CONTROL METHOD THEREOF

BACKGROUND

Technical Field

The present disclosure is related to an ultrasound transducer and a control method thereof. More particularly, the present disclosure is related to an ultrasound transducer for facilitating waste clearance of the brain lymphatic system and a control method thereof.

Related Art

In general, the lymphatic system is referred to a general term for various lymphatic organs composed of lymphatic vessels, and lymphnodes, etc. In a certain biological tissue, clearance of wastes and conservation of interstitial solutes, while balancing osmotic pressure gradient across cells, plays crucial roles in normal functions and hemostasis of the biological tissue. The lymphatic system collects plasma from the blood stream, along with various molecules or proteins, and drains them into peripheral lymphatic vessels. Therefore, the lymphatic system serves as drainage of various metabolic wastes, including cell debris and foreign molecules such as bacteria and macromolecules. Also, as an important part of the immune system that involves the spleen, the thymus, and the bone marrow, the lymphatic system mediates immune cell trafficking and activation for adaptive immune responses [reference document 1, 2].

Since the discovery of the lymphatic system in 17th century, researches on its functions and anatomical features have been conducted extensively [reference document 3]. Compared to the lymphatic systems elsewhere in the body, the lymphatic network in the central nervous system (CNS) has unique features, for example, different shape of lymphatic endothelial cells and absence of valve structures in the part of the meningeal lymphatic vessels [reference document 4]. As compared to other organs, the CNS in humans shows extraordinarily high metabolic rates whereas the brain cells are extremely sensitive and vulnerable to intra-/extra-cellular environment; therefore, the CNS requires efficient and rapid waste clearance [reference documents 5, 6].

The CNS of mammals including the brain and the spine is immersed in cerebrospinal fluid (CSF). Cerebral vasculature includes the blood-brain-barrier (BBB). The BBB acts as a physical barrier separating the blood circulating in the vasculature and protects the brain parenchyma from other foreign/immunogenic substances, while it allows for passive diffusional transport of water, lipid-/water-soluble molecules as well as facilitating active transport of key nutrients [referenced documents 7, 8]. Surrounding cerebral tissues including the BBB are referred to as Neurovascular Unit (NVU) and composed of cerebral vascular endothelial cells, pericytes, neurons, glial cells, smooth muscle cells and extracellular matrix components [reference document 9].

The CSF is mainly produced by the structure referred to as choroid plexus, in the ventricle. Recently, leptomeningeal vasculature itself was also found as the contributing site for CSF production [reference document 10]. The CSF moves to the arachnoid space, transported to the brain parenchyma through CSF/interstitial fluid (ISF) exchange, and eventually drained to perivenous space as well as to the lymphatic vessels via the olfactory bulb and cranial/spinal nerves [referenced documents 6, 11, 12]. Different classes of lymphatic vessels (e.g. the absence of lymphatic valves) were identified in the brain, typically being aligned along the blood vessels at the dural surface/meninges [reference documents 4, 13-15].

The interstitial space (ISS) between the neurons and glia in the brain parenchyma is occupied by the brain ISF, which has similar composition as the CSF. The ISF and CSF are believed to be continuously exchanged, hypothetically nearby the NVU The interstitial space (ISS) of the brain present between the neurons and glia cells of the cerebral tissue is occupied with ISF [reference documents 5, 6, 9, 11, 16, 17], and perform an important role for clearing foreign materials and metabolic wastes into the lymphatic system. Despites decades of research, the extremely complicated outflow passages of materials in connection with osmotic/hydrostatic/hydrodynamic pressure are not clearly identified [reference documents 6, 12], thus requiring further investigation to delineate the exact mechanism of CSF/ISF exchange and drainage.

In the prior animal research conducted by Cserr et al. in 1970s, it was revealed that the CSF and ISF showed directional flow in the brain. They injected CSF tracers, having different molecular weight/sizes, directly into the caudate of the animal brain, and monitored its movement over time. Longer range transport of 40 kDa horseradish peroxidase (HRP), compared to the larger (2000 kDa) blue dextran suggested a presence of movement of these solutes through the interstitial space (ISS) [reference document 18, 19].

The question on how the exchange and drainage between CSF and ISF occur was rekindled by the research conducted by Nedergaard et al. using modern imaging techniques (in vitro 2 photo microscopy and high-resolution Magnetic Resonance Imaging (MRI)) [reference documents 11, 20]. Iliff affiliated with the same laboratory as Nedergaard injected fluorescence-labeled dextran and ovalbumin into the cistern of the brain of mice (i.e., CSF space), then monitored the movement thereof [reference document 11]. This research revealed the existence of the paravascular space, that are presumably mediated by aquaporin-4 (AQP4) channels, which are expressed on the astroglial endfeet that surrounding the cerebral vasculature [reference documents 11, 21]. These research studies conjectured that that the CSF in the subarachnoid space flows to the perivascular Virchow-Robin space (VRS) that has low fluid resistance to CSF influx, and subsequently is transported to the brain parenchyma via AQP4 water channels, being facilitated by vascular pulsatility/motion and respiration [reference documents 20, 22, 23]. It was also conjectured that the net influx creates a convective bulk flow motion (hereinafter referred to as 'bulk flow') of the ISF toward peri-venous space, whereby ISF is collected in the cerebral lymphatic vessels and subsequently drained into the cervical lymph nodes [reference document 6].

Meanwhile, the clearance of metabolic byproducts existing in the brain ISF space, such as β-amyloid protein and lactates, which were considered as being closely related to Alzheimer's disease (AD), was dependent on state of arousal [reference documents 24-27] or body posture (supine position or lateral decubitus position) [referenced 28]. Further, it was identified that physical activity was also a contributing factor in facilitating brain lymphatic influx in mice [reference document 29]. The clearance becomes inefficient with aging, along with phenotypic/morphological changes in cells consisting of meningeal lymphatics in mice [reference documents 15, 17].

It was shown that AQP4 channels help the flow of CSF into cerebral tissues, and perform a role for clearing solutes of β-amyloid in the brain through animal testing [reference documents 11, 17, 24]. Although the AQP4 were hypothesized as a source of bulk-flow (i.e. convective) movement of the solutes by 'propelling' the CSF into the ISF space, the exact role of AQP4 in ISF/CSF exchange is still debated [reference documents 5, 30, 31]. According to the computer simulation and subsequent animal testing reproducing the solute movement in the brain [reference documents 5, 27, 30-33], CSF-ISF exchange occurs through diffusion, not bulk-flow, at least within the brain parenchyma (small molecules or compounds move via cerebral tissue interstitial fluid by osmotic pressure) while convective flow is more prominent along the perivascular spaces in the larger cerebral vessels through the pores on their surface (e.g., 'stomata' that lines leptomegnigeal vessels) [reference document 5]. Meanwhile, it was observed that diffusion and bulk flow coexist in white matter tracts [reference document 35].

Researches based on animal testing have been extended to humans recently. Eide and Ringstad injected MRI contrast agents directly into the spinal cord of idiopathic normal pressure hydrocephalus (iNPH) patients or those with suspected CSF leaks, then studied CSF dynamics using magnetic resonance imaging (MRI). This research showed that the MRI contrast agents injected in CSF spread out across the cerebral cortices, then were absorbed into the brain in maximum quantities after approximately 4-6 hours (differences exist depending on the brain regions), and were centripetally transported to deep brain areas along with the skull base direction in around 24 hours. Various arteries are distributed intensively in the skull base, and thus relatively many paravascular spaces exist therein as the final drainage stage. This supports that the brain waste clearance may occur with the direction from the cerebral cortex to the deep brain area, particularly to the skull base in humans [reference documents 37, 38]. Recently, temporary disruption of the BBB in humans, followed by injection of MRI contrast agents and its imaging, verified that the meningeal lymphatic system is present in humans [reference document 39].

Regarding the clinical manifestation of the abnormal brain lymphatic function, various small animal model studies have indicated that the aberrant brain lymphatic function may ramify into various neurological conditions. For example, impaired brain lymphatic function in AQP4 knockout mice resulted in a significant reduction in clearance of radiolabeled (125I)-Aβ injected into the striatum, compared to that of the wild-type [reference document 11]. Impaired lymphatic function was also demonstrated in murine model of cerebral microinfarct and subarachnoid hemorrhage [reference documents 40, 41]. Particularly, Traumatic brain injury (TBI) in mice lead to decreased lymphatic influx and impaired clearance of intracortically-injected radiotracers from the brain for sustainable period (~1 month) while the injury increased accumulation of Tau proteins [reference document 42]. In Alzheimer's disease (AD) mouse model, age-dependent, less polar (i.e. more even) distribution of AQP4 expression in the brain parenchyma may indicate abnormal lymphatic function implicated in AD [reference documents 11, 43].

Apart from these relations to neurological conditions, the brain lymphatic clearance of the metabolite during sleep rose as another important area of investigation as the function of brain lymphatic system is closely associated with sleep [reference documents 24, 26]. Sleep deprivation and sleep-wake cycle influence the level of the Tau proteins in the ISF/CSF in both humans and mice [referenced document 44]. Based on these findings, it is plausible to conjecture that facilitated clearance of the waste products by enhancing the lymphatic function in the brain may compensate for suboptimal clearance of waste products, for example, accumulation of the lactate due to lack of sleep [reference document 26].

It is a commonly established theory that the cerebral vasculatures become stiff/hardened according to aging, and decreases artery pulsation facilitating the circulation of the brain lymphatic system. This translates to increased likelihood of Alzheimer's disease. Furthermore, sleep clears waste products from the brain by increasing the function of the brain lymphatic system. Therefore, artificial means of activating lymphatic function/clearance will improve a variety of problems in association with sleep deprivation. Therefore, how to clear lymphatic wastes of the brain rapidly and efficiently have been the subjects of investigation.

Meanwhile, ultrasound has been applied to the brain with concomitant intravenous injection of microbubble-based ultrasound contrast agents. This technique disturbs and temporarily opens the BBB by pushing endothelial cells of surrounding cerebral vessels out via amplification of the localized ultrasound pressure due to inertial-/stable-cavitation of the injected microbubble contrast agents. This technique was originally developed to deliver therapeutic drugs (having a large molecular weight) across the BBB. Despite this original intention, recent studies have suggested that the plasma/CSF/ISF which leak through the disrupted BBB may also allow for facilitating the brain lymphatic function. However, the technique suffers from serious drawbacks of potentially causing cerebral hemorrhage (critical risk factor) if the BBB is excessively disturbed or destroyed, which causes the blood cells to be leaked out of the cerebral vasculature. Furthermore, the technique cannot be used among the individuals who are allergic to or counterindicated to the microbubble contrast agents.

RELATED ART DOCUMENT

Non-Patent Document

1. Engelhardt, B., P. Vajkoczy, and R. O. Weller, The movers and shapers in immune privilege of the CNS. Nat Immunol, 2017. 18(2): p. 123-131.
2. Meyer, C., G. Martin-Blondel, and R. S. Liblau, Endothelial cells and lymphatics at the interface between the immune and central nervous systems: implications for multiple sclerosis. Curr Opin Neurol, 2017. 30(3): p. 222-230.
3. Natale, G., G. Bocci, and D. Ribatti, Scholars and scientists in the history of the lymphatic system. J Anat, 2017. 231(3): p. 417-429.
4. Ahn, J. H., et al., Meningeal lymphatic vessels at the skull base drain cerebrospinal fluid. Nature, 2019. 572(7767): p. 62-66.
5. Abbott, N. J., et al., The role of brain barriers in fluid movement in the CNS: is there a 'glymphatic' system? Acta Neuropathol, 2018. 135(3): p. 387-407.
6. Jessen, N. A., et al., The Glymphatic System: A Beginner's Guide. Neurochem Res, 2015. 40(12): p. 2583-99.
7. Abbott, N. J. and I. A. Romero, Transporting therapeutics across the blood-brain barrier. Mol Med Today, 1996. 2(3): p. 106-13.
8. Cammalleri, A., et al., Therapeutic Potentials of Localized Blood-Brain Barrier Disruption by Noninvasive Transcranial Focused Ultrasound: A Technical Review. J Clin Neurophysiol, 2020. 37(2): p. 104-117.

9. Muoio, V., P. B. Persson, and M. M. Sendeski, The neurovascular unit-concept review. Acta Physiol (Oxf), 2014. 210(4): p. 790-8.
10. Li, Q., et al., Aquaporin 1 and the Na(+)/K(+)/2Cl(−) cotransporter 1 are present in the leptomeningeal vasculature of the adult rodent central nervous system. Fluids Barriers CNS, 2020. 17(1): p. 15.
11. Iliff, J. J., et al., A paravascular pathway facilitates CSF flow through the brain parenchyma and the clearance of interstitial solutes, including amyloid beta. Sci Transl Med, 2012. 4(147): p. 147ra111.
12. Benveniste, H., et al., The Glymphatic System and Waste Clearance with Brain Aging: A Review. Gerontology, 2019. 65(2): p. 106-119.
13. Aspelund, A., et al., A dural lymphatic vascular system that drains brain interstitial fluid and macromolecules. J Exp Med, 2015. 212(7): p. 991-9.
14. Louveau, A., et al., Structural and functional features of central nervous system lymphatic vessels. Nature, 2015. 523(7560): p. 337-41.
15. Da Mesquita, S., et al., Functional aspects of meningeal lymphatics in ageing and Alzheimer's disease. Nature, 2018. 560(7717): p. 185-191.
16. Da Mesquita, S., Z. Fu, and J. Kipnis, The Meningeal Lymphatic System: A New Player in Neurophysiology. Neuron, 2018. 100(2): p. 375-388.
17. Kress, B. T., et al., Impairment of paravascular clearance pathways in the aging brain. Ann Neurol, 2014. 76(6): p. 845-61.
18. Cserr, H. F. and L. H. Ostrach, Bulk flow of interstitial fluid after intracranial injection of blue dextran 2000. Exp Neurol, 1974. 45(1): p. 50-60.
19. Cserr, H. F., D. N. Cooper, and T. H. Milhorat, Flow of cerebral interstitial fluid as indicated by the removal of extracellular markers from rat caudate nucleus. Exp Eye Res, 1977. 25 Suppl: p. 461-73.
20. Iliff, J. J., et al., Cerebral arterial pulsation drives paravascular CSF-interstitial fluid exchange in the murine brain. J Neurosci, 2013. 33(46): p. 18190-9.
21. Iliff, J. J., et al., Brain-wide pathway for waste clearance captured by contrast-enhanced MRI. J Clin Invest, 2013. 123(3): p. 1299-309.
22. Fultz, N. E., et al., Coupled electrophysiological, hemodynamic, and cerebrospinal fluid oscillations in human sleep. Science, 2019. 366(6465): p. 628-631.
23. Yamada, S., et al., Influence of respiration on cerebrospinal fluid movement using magnetic resonance spin labeling. Fluids Barriers CNS, 2013. 10(1): p. 36.
24. Xie, L., et al., Sleep drives metabolite clearance from the adult brain. science, 2013. 342(6156): p. 373-377.
25. Benveniste, H., et al., Anesthesia with Dexmedetomidine and Low-dose Isoflurane Increases Solute Transport via the Glymphatic Pathway in Rat Brain When Compared with High-dose Isoflurane. Anesthesiology, 2017. 127(6): p. 976-988.
26. Lundgaard, I., et al., Glymphatic clearance controls state-dependent changes in brain lactate concentration. J Cereb Blood Flow Metab, 2017. 37(6): p. 2112-2124.
27. Gakuba, C., et al., General Anesthesia Inhibits the Activity of the "Glymphatic System". Theranostics, 2018. 8(3): p. 710-722.
28. Lee, H., et al., The Effect of Body Posture on Brain Glymphatic Transport. J Neurosci, 2015. 35(31): p. 11034-44.
29. von Holstein-Rathlou, S., N. C. Petersen, and M. Nedergaard, Voluntary running enhances glymphatic influx in awake behaving, young mice. Neurosci Lett, 2018. 662: p. 253-258.
30. Smith, A. J., B. J. Jin, and A. S. Verkman, Muddying the water in brain edema? Trends Neurosci, 2015. 38(6): p. 331-2.
31. Smith, A. J., et al., Test of the 'glymphatic' hypothesis demonstrates diffusive and aquaporin-4-independent solute transport in rodent brain parenchyma. Elife, 2017. 6.
32 Holter, K. E., et al., Interstitial solute transport in 3D reconstructed neuropil occurs by diffusion rather than bulk flow. Proceedings of the National Academy of Sciences, 2017. 114(37): p. 9894-9899.
33. Pizzo, M. E., et al., Intrathecal antibody distribution in the rat brain: surface diffusion, perivascular transport and osmotic enhancement of delivery. J Physiol, 2018. 596(3): p. 445-475.
34. Papadopoulos, M. C., J. K. Kim, and A. S. Verkman, Extracellular space diffusion in central nervous system: anisotropic diffusion measured by elliptical surface photobleaching. Biophys J, 2005. 89(5): p. 3660-8.
35. Rosenberg, G. A., W. T. Kyner, and E. Estrada, Bulk flow of brain interstitial fluid under normal and hyperosmolar conditions. Am J Physiol, 1980. 238(1): p. F42-9.
36. Kiviniemi, V., et al., Ultra-fast magnetic resonance encephalography of physiological brain activity-Glymphatic pulsation mechanisms? J Cereb Blood Flow Metab, 2016. 36(6): p. 1033-45.
37. Eide, P. K., et al., Magnetic resonance imaging provides evidence of glymphatic drainage from human brain to cervical lymph nodes. Sci Rep, 2018. 8(1): p. 7194.
38. Ringstad, G., et al., Brain-wide glymphatic enhancement and clearance in humans assessed with MRI. JCI Insight, 2018. 3(13).
39. Meng, Y., et al., Glymphatics Visualization after Focused Ultrasound-Induced Blood-Brain Barrier Opening in Humans. Ann Neurol, 2019. 86(6): p. 975-980.
40. Wang, M., et al., Focal Solute Trapping and Global Glymphatic Pathway Impairment in a Murine Model of Multiple Microinfarcts. J Neurosci, 2017. 37(11): p. 2870-2877.
41. Pu, T., et al., Persistent Malfunction of Glymphatic and Meningeal Lymphatic Drainage in a Mouse Model of Subarachnoid Hemorrhage. Exp Neurobiol, 2019. 28(1): p. 104-118.
42. Iliff, J. J., et al., Impairment of glymphatic pathway function promotes tau pathology after traumatic brain injury. J Neurosci, 2014. 34(49): p. 16180-93.
43. Rasmussen, M. K., H. Mestre, and M. Nedergaard, The glymphatic pathway in neurological disorders. The Lancet Neurology, 2018. 17(11): p. 1016-1024.
44. Holth, J. K., et al., The sleep-wake cycle regulates brain interstitial fluid tau in mice and CSF tau in humans. Science, 2019. 363(6429): p. 880-884.

SUMMARY

Technical Problem

The present disclosure is provided to solve conventional problems as described above. The object of the present disclosure is to provide, to users, an ultrasound transducer for facilitating waste clearance of the brain lymphatic system by applying dynamic ultrasound pressure waves passing through the skull of mammals to the deep brain areas, which enhances bulk flow movement of solutes included in brain wastes so as to increase absorption thereof into paravascular spaces, along with a control method thereof.

Meanwhile, technical objects to be achieved in the present disclosure are not limited to the aforementioned technical object, and other technical objects, which are not mentioned above, will be apparently understood to a person having ordinary skill in the art from the following description.

Technical Solution

A transducer according to an embodiment of the present disclosure include: an oscillator including a plurality of Piezoelectric materials and a polymer encompassing the plurality of Piezoelectric materials, and irradiating an ultrasound using at least one of the plurality of Piezoelectric materials and the polymer; a lens having a first space where at least a part of the oscillator is inserted, and focuses the applied ultrasound; and a housing supporting connection between the oscillator and the lens. A height of the oscillator may be longer than a height of the first space. A first height difference between the height of the oscillator and the height of the first space may be inverse proportion to overall height of the lens. A width of the oscillator may be smaller than a width of the first space.

Further, the first height difference may be a length within 30% of the overall height, and the width of the oscillator may be small within 0.6% of the width of the first space.

Further, the housing may further include a first housing of a structure encompassing the lens and an oscillator area where the lens is inserted; a second housing of a structure encompassing the lens and an oscillator area where the lens is not inserted; and a third housing encompassing the second housing and is combined with the first housing. At least a part of the third housing may further include further comprises a connector for connection with the outside.

Meanwhile, an ultrasound device for facilitating waste clearance of the brain lymphatic system according to an embodiment of the present disclosure includes a frequency-generator generating a predetermined frequency; a waveform modulator modulating a waveform of the frequency; a linear amplifier amplifying the waveform; a resonance circuit portion matching impedance of the amplified waveform; and a transducer coupled to the resonance circuit portion and irradiating an ultrasound toward the brain of mammals, according to any one of claim 1 to claim 3. The ultrasound may facilitate waste clearance of the lymphatic system.

Further, the transducer may be provided in plural number. The ultrasound device may generate a pulse using output of at least a part of the transducer, and change Pulse Length (PL), that is, a length of the pulse, Burst Duration (BD) of a burst where the pulses are formed in plural number and a Burst Interval (BI) between the bursts by controlling operations of a plurality of the transducers.

Further, a maximum output of a plurality of the linear amplifiers associated with the plurality of the transducers may be optionally adjusted, allowing controlling a final output of the ultrasound irradiated toward the brain of mammals.

Further, the number of the plurality of transducers may be four, and the plurality of the linear amplifiers includes a 1-1 linear amplifier coupled to both a 1-1 transducer and a 1-2 transducer among the four transducers, and a 1-2 linear amplifier coupled to both a 1-3 transducer and a 1-4 transducer.

Further, the ultrasound device for facilitating waste clearance of the brain lymphatic system may be capable of supporting multiple channels. When using one channel among the multiple channels, the 1-1 transducer may be connected with the 1-1 linear amplifier, followed by being operated. When using two channels among the multiple channels, the 1-1 transducer is connected with the 1-1 linear amplifier while connecting the 1-3 transducer with the 1-2 linear amplifier, followed by being operated. When using four channels among the multiple channels, the 1-1 transducer and the 1-2 transducer may be connected with the 1-1 linear amplifier while connecting the 1-3 transducer and the 1-4 transducer with the 1-2 linear amplifier, followed by being operated.

Further, a plurality of matching confirmation portions may be provided between the plurality of the transducers and the plurality of the linear amplifiers. The plurality of the matching confirmation portions may confirm an output frequency of the ultrasound irradiated through the plurality of the transducers based on signal information received from the plurality of the linear amplifiers.

Further, at least a part of the plurality of the transducer may be detach-and-attachable. A frequency of the ultrasound irradiated toward the brain of mammals may be changeable according to the transducer changed according to detach-and attachment.

Further, the plurality of the transducers may be positioned along a circumference of the brain to face mutually with each other, and then being aligned so as to irradiate the ultrasound toward deep areas of the brain.

Further, the ultrasound device for facilitating waste clearance of the brain lymphatic system may further include a head gear where the plurality of the transducers is fixed. The plurality of the transducers may irradiate the ultrasound sequentially.

Further, the ultrasound device for facilitating waste clearance of the brain lymphatic system may further include a coupling gel so as to acoustically couple at least a part of the plurality of the transducers to the skin of mammals.

Further, in the ultrasound to be irradiated toward the brain of mammals, a band of a pulse waveform may range from 100 KHz to 800 KHz, a tone burst duration (D) may range from 1 ms to 500 ms, and a duty cycle may range from 0.3 to 70%.

Advantageous Effects

According to one embodiment of the present disclosure, it is capable of facilitating waste clearance of the brain lymphatic system by irradiating ultrasound to the deep brain areas of mammals through the skull, then inducing bulk flow by dynamic pressure, whereby enhancing the movement of solutes such as beta and tau proteins in brain wastes to induce absorption thereof into the paravascular spaces.

Further, according to the present disclosure, it is capable of irradiating ultrasound to different areas of the brain (e.g.: left brain and right brain) sequentially without the microbubble contrast-agent, whereby preventing the occurrence of the deleterious effects of the microbubble (allergic reactions, cerebral hemorrhage increases, risks according to BBB disturbance).

Meanwhile, advantageous effects to be obtained in the present disclosure are not limited to the aforementioned effects, and other effects, which are not mentioned above, will be apparently understood to a person having ordinary skill in the art from the following description.

BRIEF DESCRIPTION OF THE DRAWINGS

The accompanying drawings of this specification exemplify a preferred embodiment of the present disclosure, the spirit of the present disclosure will be more clearly understood from the following detailed description taken in conjunction with the accompanying drawings, and thus it will be understood that the present disclosure is not limited to only contents illustrated in the accompanying drawings.

FIG. 13A and FIG. 13B show a particular example in which a multi-channel transducer is controlled through multi-frequency.

DETAILED DESCRIPTION

Description of Embodiments

Figure 1:
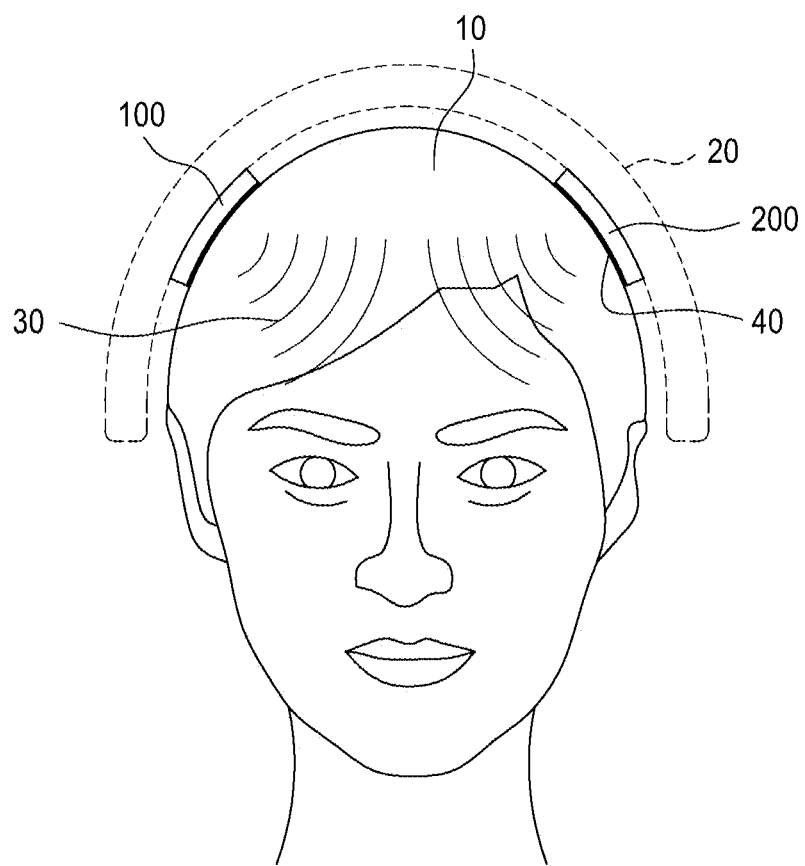
FIG. 1 shows a first example for wearing an ultrasonic device according to the present disclosure.

Hereinafter, embodiments of the present disclosure will be explained in detail with reference to the accompanying drawings in order to be easily implemented by those having ordinary knowledge in the art to which the present disclosure pertains. However, the following detailed description merely delineates the embodiments for structural or functional explanation of the present disclosure. Thus, it should be not interpreted that the scope of the present disclosure is limited to the embodiments explained in the specification. That is, since the embodiments are able to be modified variously and have a variety of forms, it should be understood that the scope of the present disclosure include equivalents capable of implementing the technical idea. Further, the objects or effects provided in the present disclosure do not mean that a particular embodiment includes either all of them or such effects only. Thus, it should be not understood that the scope of the present disclosure is limited thereto.

The terms used in the present disclosure should be understood as the followings.

Since the terms, such as "first", "second", etc., are used for distinguish one element from other elements, the scope of the present disclosure should be not limited thereto. For example, "a first element" may be referred to as "a second element" and similarly hereto, "a second element" may be referred to as "a first element". When mentioning that an element is "connected" to the other element, it may be connected directly thereto, however, it should be understood that there may be another element between them. Whereas, when mentioning that an element is "connected directly" to the other element, it should be understood that there may be not any other element between them. Meanwhile, it should be also understood in the same way as the above in case of expressions for explaining the relationship between elements, i.e. "between~" and "directly between~", or "adjacent to~" and "adjacent directly to~".

It should be understood that the singular expression includes the plural expression unless specifically stated otherwise. The terms, such as "comprise" and "have", etc., indicate the existences of the implemented features, numbers, steps, operations, elements, components or any of combinations thereof. It should be understood that they do not preclude the potential existences or additions of one or more features, numbers, steps, operations, elements, components or any of combinations thereof.

Unless otherwise defined, all terms used herein have the same meanings as those commonly understood by those having ordinary knowledge in the art to which the present disclosure pertains. It should be understood that the terms defined in commonly used dictionaries, should be interpreted to be consistent with the meanings contextually stated in the field of relevant art and will not be interpreted to have idealized or excessively formalistic senses unless explicitly defined in the present disclosure.

Configuration of a First Embodiment

Figure 3:
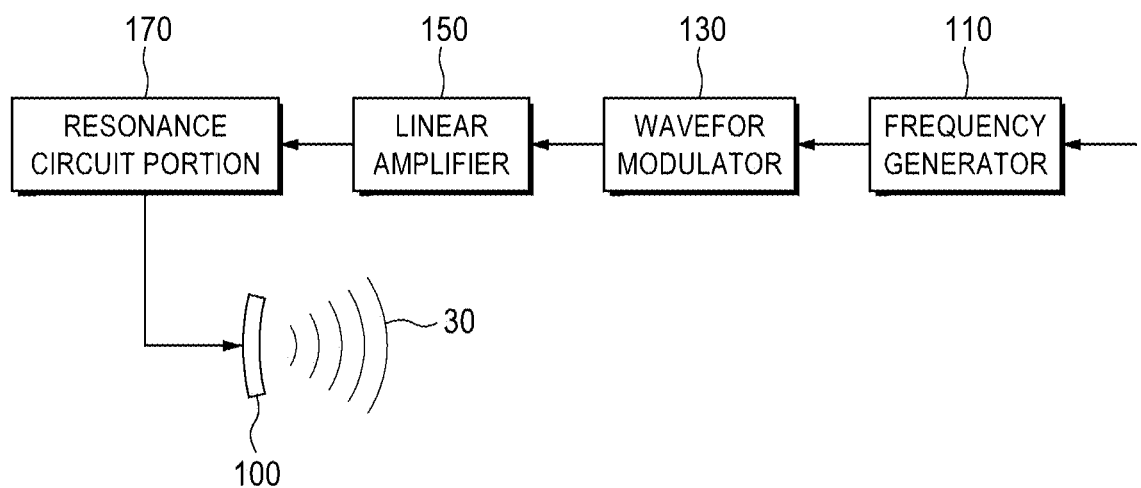
FIG. 3 shows a schematic block diagram of an ultrasound device for facilitating waste clearance of the brain lymphatic system according to a first embodiment of the present disclosure.

Hereinafter, a configuration of a first embodiment will be described referring to accompanying drawings. In a first embodiment of the present disclosure, disclosed is a configuration for operating one first ultrasound transducer 100. FIG. 3 shows a schematic block diagram of an ultrasound device for facilitating waste clearance of the brain lymphatic system according to a first embodiment of the present disclosure. As shown in FIG. 3, a frequency-generator 110 generates a predetermined low frequency (e.g.: pulse waveform in a band of 100 KHz to 500 KHz). Ultrasound by a frequency exceeding 800 KHz is absorbed in the human skull to the extent of approximately 70% or more, thus lowering efficiencies thereof.

Further, in one embodiment of the present disclosure, an intensity of ultrasound 30 is a spatial peak pulse average intensity ($I_{sppa}$) ranging from 0.1 to 190 Watt/cm². Internationally permissible intensity for humans is 190 Watt/cm² at the maximum which is applied to medical ultrasound imaging systems.

Further, a focal point of the ultrasound 30 has a spatial peak temporal average intensity ($I_{spta}$) ranging from 100 to 1500 mWatt/cm².

According to the present disclosure, a permissible limit for human may be 1500 Watt/cm² at the maximum which is applied to medical ultrasound imaging systems.

Further, a tone burst duration (D) of the ultrasound 30 ranges from 100 ms to 500 ms, operating at a duty cycles to an extent from 0.3 to 70%. If D is lower than 1 ms, a clearance facilitation effect is less significant. If exceeding 500 ms, a duty cycle is adjusted (i.e. reduced) not to exceed $I_{spta}$ depending on relevant $I_{sppa}$. Excessive $I_{spta}$, in general, may elevate the temperature of tissues, and thus should be avoided.

A waveform modulator 130 modifies a waveform of a generated frequency into a waveform having a pulse envelope 60 or a half sine envelop 65.

A linear amplifier 150 amplifies the modified pulse waveform to a predetermined extent.

A resonance circuit portion 170 matches an impedance of the ultrasound transducer.

The first ultrasound transducer 100 is coupled to the resonance circuit portion 170, irradiating ultrasound. Further, the first ultrasound transducer 100 is capable of being fixed to a head gear 20, thus being fixed to a wearer as the individual wears the head gear 20. The first transducer 100 is aligned so as to irradiate the ultrasound 30 of dynamic pressure wave with a wide focal area toward deep areas of the brain 10 (e.g., the hippocampus).

The first ultrasound transducer 100 is constituted with a plurality of ultrasound probe arrays and has a structure adopted to generate a low-intensity ultrasound. The ultrasound probe array of the first ultrasound transducer 100 has a structure that (1) a plurality of ultrasound elements that are arranged coaxially in a circular or asymmetrical form, or (2) a plurality of disc-typed (circle or square) ultrasound elements is arranged toward a specific direction. (3) A single-element piezo-material can also be adopted. The plurality of ultrasound probes of the first transducer 100 regulates each phase, thus being endowed with a function to focus ultrasound into a specific position and also regulates the phases, thus regulating ultrasound directions (beam steering). In case of a single-element transducer, the geometry and direction of the transducer determines the position of the beam focus and the direction of the ultrasound. The transducer may have either focused or non-focused configuration, depending on the area of sonication.

In the first embodiment of the present disclosure, the configuration is made up of the first ultrasound transducer 100 only. The first ultrasound transducer 100 works independently but not requiring the focusing ability to an extent of traditionally-defined focused ultrasound. In such a process, bulk flow of ISF is induced by the dynamic pressure of the ultrasound, thus enhancing the movement of solutes including brain wastes. Whereby, the solutes are absorbed more rapidly in the paravascular space, thus allowing for facilitated clearance of lymphatic wastes of the brain. On the other hand, in order to maximize dynamic pressure effects, ultrasound in a low frequency band is used.

The ultrasound 30 irradiated by the first ultrasonic transducer 100 pushes solutes including various wastes from the exterior of the brain to the deep areas thereof, to the deep brain areas.

A coupling gel 40 is applied between the first ultrasonic transducer 100 and wearer's scalp, thus configuring a coupling acoustically. The coupling gel 40 is made from synthetic materials capable of elastic compression so as to allow the coupling gel 40 to adhere closely to a curve of the scalp, and this may include hydrous gel or silicone such as Polyvinyl Alcohol (PVA) from which gas is removed.

The coupling gel 40 includes hydrous gel, silicon and a water bag.

That is, the water bag or silicone is positioned at a position in the middle of the coupling agent, allowing increasing the efficiency thereof.

Figure 5:
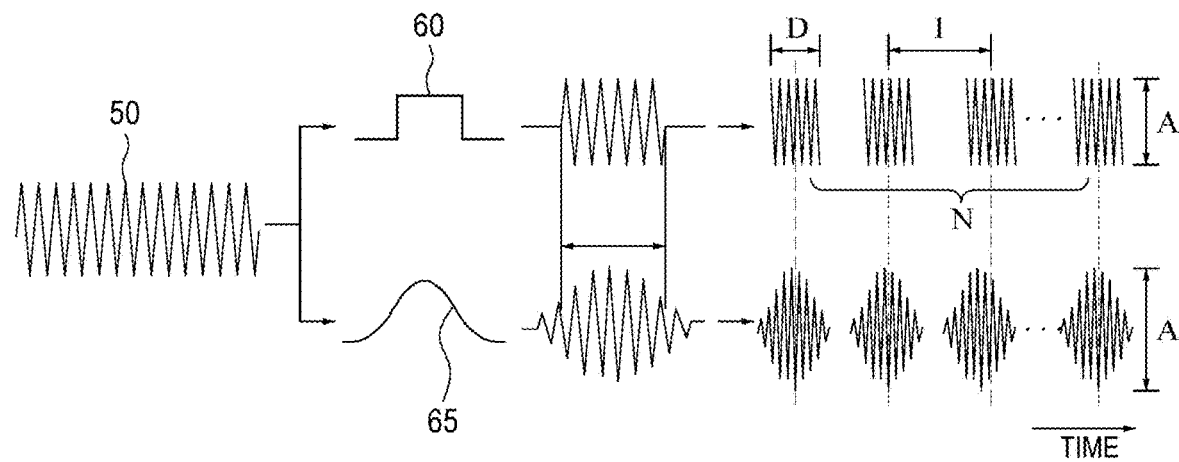
FIG. 5 shows a diagram of a waveform showing modification in a waveform of ultrasound used in an ultrasound device according to the present disclosure.

FIG. 5 shows a diagram of a waveform showing modification in a waveform of the ultrasound 30 used in an ultrasound device according to the present disclosure. As shown in FIG. 5, a frequency 50 generated in the frequency-generator 110 may be modified by using the pulse envelope 60 or the half sine envelope 65. At this time, D, as the Tone Burst Duration (TBD), ranges 1 ms to 500 ms. 'I' means Inter-Pulse-Interval (IPI; expressed in second). The inverse number of I is, as Pulse Repetition Frequency (PRF), expressed as Hertz. TBD and PRF together determine a duty cycle (%) that is a ratio of a period (i.e., time it takes for irradiating ultrasound) occupied by TBD×PRF per second. The number (N) of pulses is adjusted, then determining total time it takes for irradiating the ultrasound, and intensity/power of the ultrasound is determined by adjusting the magnitude (A) of peak-to-peak of the waveform.

Configuration of a Second Embodiment

Hereinafter, a configuration of a second embodiment will be described referring to accompanying drawings. In the second embodiment of the present disclosure, the disclosed configurations for operating a first ultrasound transducer 100 and a second ultrasound transducer 200.

Figure 4:
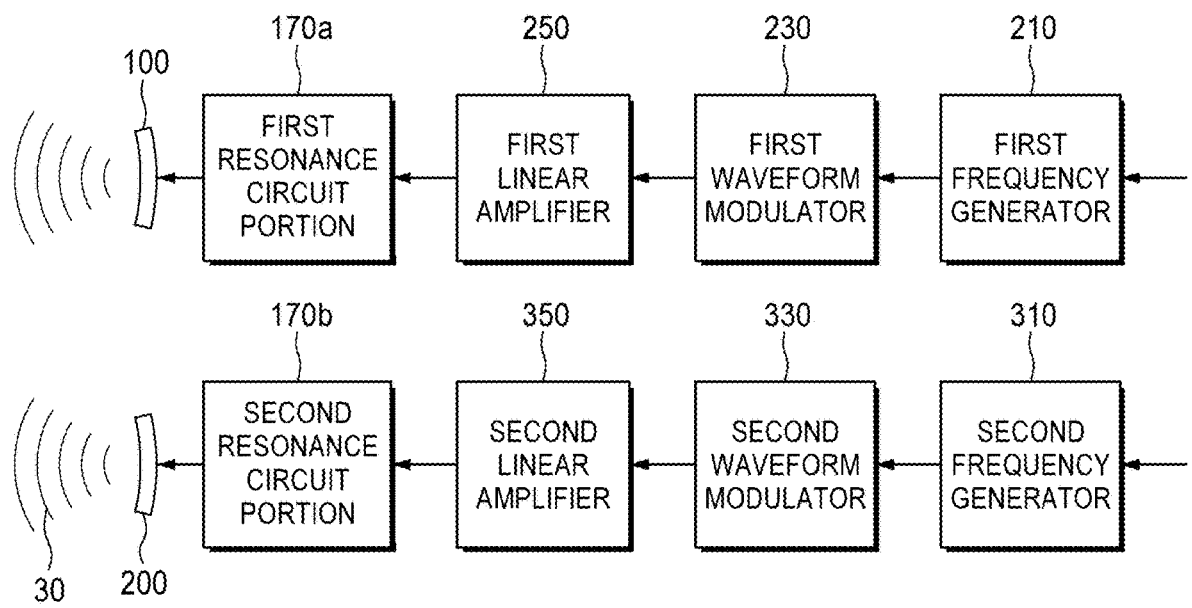
FIG. 4 shows a schematic block diagram of an ultrasound device for facilitating waste clearance of the brain lymphatic system according to a second embodiment of the present disclosure.

FIG. 4 shows a schematic block diagram of an ultrasound device for facilitating waste clearance of the brain lymphatic system according to a second embodiment of the present disclosure. As shown in FIG. 4, As shown in FIG. 4, in order to operate the first ultrasonic transducer 100, the ultrasound device has a first frequency-generator 210, a first waveform modulator 230 and a first linear amplifier 250. And, in order to operate the second ultrasonic transducer 200, the ultrasound device has a second frequency-generator 310, a second waveform modulator 330 and a second linear amplifier 350. The first frequency-generator 210 and the second frequency-generator 310 are the same as the frequency-generator 110 according to the first embodiment in configurations and functions. The first waveform modulator 230 and the second waveform modulator 330 are the same as the waveform modulator 130 according to the first embodiment in configurations and functions. The first linear amplifier 250 and the second linear amplifier 350 are the same as the linear amplifier 150 according to the first embodiment in configurations and functions. A first resonance circuit portion 170a and a second resonance circuit portion 170b are the same as the resonance circuit portion 170 according to the first embodiment in configurations and functions. The first ultrasound transducer 100 and the second ultrasound transducer 200 are identical with each other in configurations and functions but may be different in installation positions and irradiated frequencies, as necessary.

Further, in configurations of the second embodiment, configurational elements having a plurality channels may be merge with each other. For example, the first and second linear amplifiers 250, 350 may be replaced with one linear amplifier having outputs for a 2-channel amplifier. Further, the first and second frequency-generators 210, 310 may be replaced by dividing a frequency output from one frequency-generator.

FIG. 1 shows a first example for wearing an ultrasonic device according to the present disclosure. As shown in FIG. 1, the first and second ultrasound transducers 100, 200 are installed in the head gear 20, and are positioned closely to the scalp as a wearer wears the head gear 20. Particularly, in the first example, the first and second ultrasound transducers 100, 200 are positioned in the vicinity of opposite temples of the wearer respectively, then being aligned so as to irradiate the ultrasound (30) toward the deep areas of the brain 10.

Figure 2:
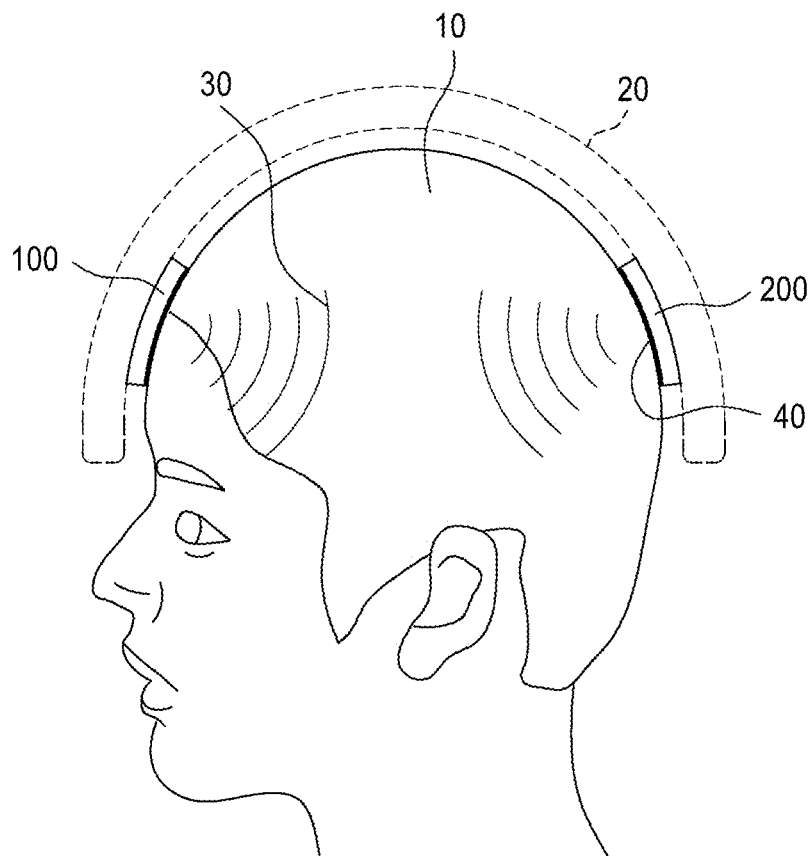
FIG. 2 shows a second example for wearing an ultrasonic device according to the present disclosure.

FIG. 2 shows a second example for wearing an ultrasonic device according to the present disclosure. As shown in FIG. 2, the first ultrasound transducer 100 adheres closely to a forehead region of the wearer and the second ultrasound transducer 200 is aligned so as to adhere closely to a region of the back of wearer's head. It is the same to align the first and second transducers so as to irradiate the ultrasound 30 toward the deep areas of the brain 10 as in the aforementioned first example.

Figure 6:
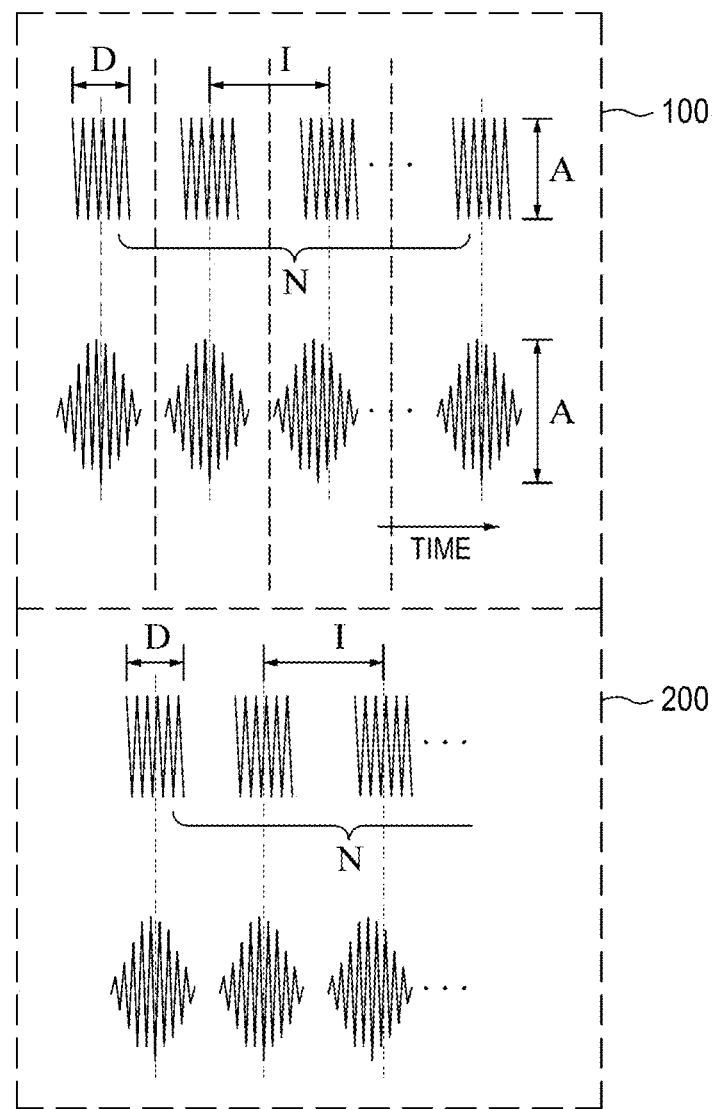
FIG. 6 shows a waveform when first and second transducers work sequentially in the second embodiment as shown in FIG. 4.

FIG. 6 shows a waveform when first and second transducers 100, 200 work sequentially in the second embodiment as shown in FIG. 4. The first and second ultrasound transducers 100, 200 may work at the same time, and also work sequentially as shown in FIG. 6. That is, the second ultrasonic transducer 200 irradiates the ultrasound 30 at intervals of the first ultrasound transducer 100 irradiates the ultrasound 30. At this time, the waveform and frequency of the first ultrasound transducer 100 may be the same as and also differ from the waveform and frequency of the second 200.

Operations of Embodiments

Hereinafter, an operation of the first embodiment will be described in detail referring to accompanying drawings. Firstly, the coupling gel 40 is applied to the first ultrasound transducer 100 and the wearer's scalp, respectively. The head gear 20 is then put on the wearer's head, so as that the first ultrasound transducer 100 is closely adhered to the scalp.

A constant frequency 50 is generated by power supply applied to the frequency-generator 110, then being modulated into a form of pulse wave or half sine wave by waveform modulator 130, followed by being amplified to a predetermined output by the linear amplifier 150 and matched with impedance by the resonance circuit portion 170. The ultrasound 30 is then irradiated from the first ultrasound transducer 100.

The irradiated ultrasound 30 passes the skull and then passes through the brain, thus being toward the deep brain areas. In such a process, bulk flow of ISF is induced by the dynamic pressure of the ultrasound, thus enhancing the movement of solutes including brain wastes. Whereby, the solutes are absorbed more rapidly in the paravascular space, thus allowing facilitating clearance of lymphatic wastes of the brain.

Total irradiation time of the ultrasound 30 may approximate 30 to 40 minutes. This is because if the irradiation time becomes longer, the wearer may feel uncomfortable while the coupling gel 40 starts to dry at a room temperature.

Further, the ultrasound may be irradiated to multiple regions of the brain (e.g.: left brain and right brain) sequentially or simultaneously.

Modification Example

According to a modification example of the present disclosure, 3 or more ultrasound transducers may be provided and disposed to be dispersed around the head of mammals.

Further, in order to optionally enhance the circulation in a specific region of the brain, it is allowable to use one or more focused ultrasound transducers.

High-Power Device Having a Multi-Channel Transducer Allowing Supporting Multiple Channels Hereinafter, a configuration of a high-power headwear according to the present disclosure will be described in detail.

Furthermore, a device suggested in the present disclosure may adjust time parameters minutely, and it may include the multi-channel transducer.

Further, a device suggested in the present application may be capable of multiple frequencies.

Figure 7:
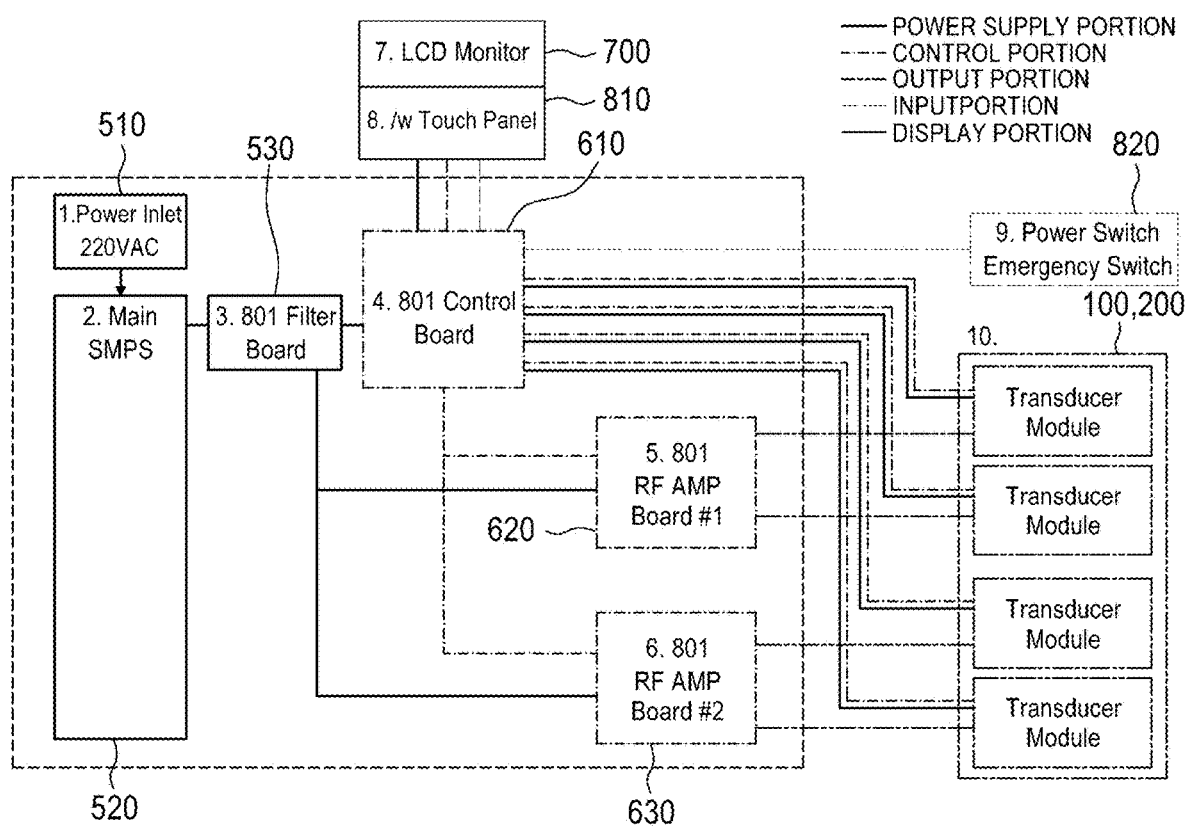
FIG. 7 shows an example of a block diagram of a device suggested in the present disclosure.

FIG. 7 shows an example of a block diagram of a device suggested in the present disclosure.

Referring to FIG. 7, the device suggested in the present disclosure may include a power supply portion 500, a control portion 600, a display portion 700, an input portion 800 and transducers 100, 200.

In particular, the power supply portion 500 may include a power inlet 510, a Main SMPS 520 and B01 Filter Board 530.

Firstly, the power inlet 510 provides a function for inputting 220 VAC/60 Hz power supplies.

Next, the Main SMPS 520 receives 220 VAC/60 Hz power supplies and then supplies DC 48V power supplies.

Further, the B01 Filter Board 530 received DC 48V power supplies from the SMPS 520 and reduces power noise, followed by supplying DC 48V power supplies to B01 Control board 610, RF AMP #1 620 and B01 RF AMP #2 630.

Further, the control portion 600 includes the B01 Control board 610, the RF AMP #1 620 and the B01 RF AMP #2 630.

Firstly, the B01 Control Board 610 is a main board controlling the product.

This inputs control over and information on the B01 RF AMP #1, #2 620, 630/transducer modules 100, 200/an LCD monitor 700, and then performs communication for confirmation thereof.

Next, the B01 RF AMP #1 620 is a device generating a duty cycle of ultrasound irradiation and amplifying an ultrasound signal, and communicates with the B01 Control board 610.

Further, the display portion 700 may be an LCD monitor and display output-related items, operating conditions of an equipment and parameters.

Further, the input portion includes a Touch Touch Panel 810 and a switch 820.

The Touch Touch panel 810 is a capacitive sensor-based input device, and is capable of inputting parameters.

The switch 820 includes an emergency switch and a power switch. The emergency switch turns off power supplies during emergencies. The power switch controls power supplies of the main body.

Lastly, the output portions 100, 200 are multiple transducer modules, and is contacted to a patient and generates ultrasound.

The output portions 100, 200 may store information of transducer identification and communicate with the B01 Control board 610.

Figure 8:
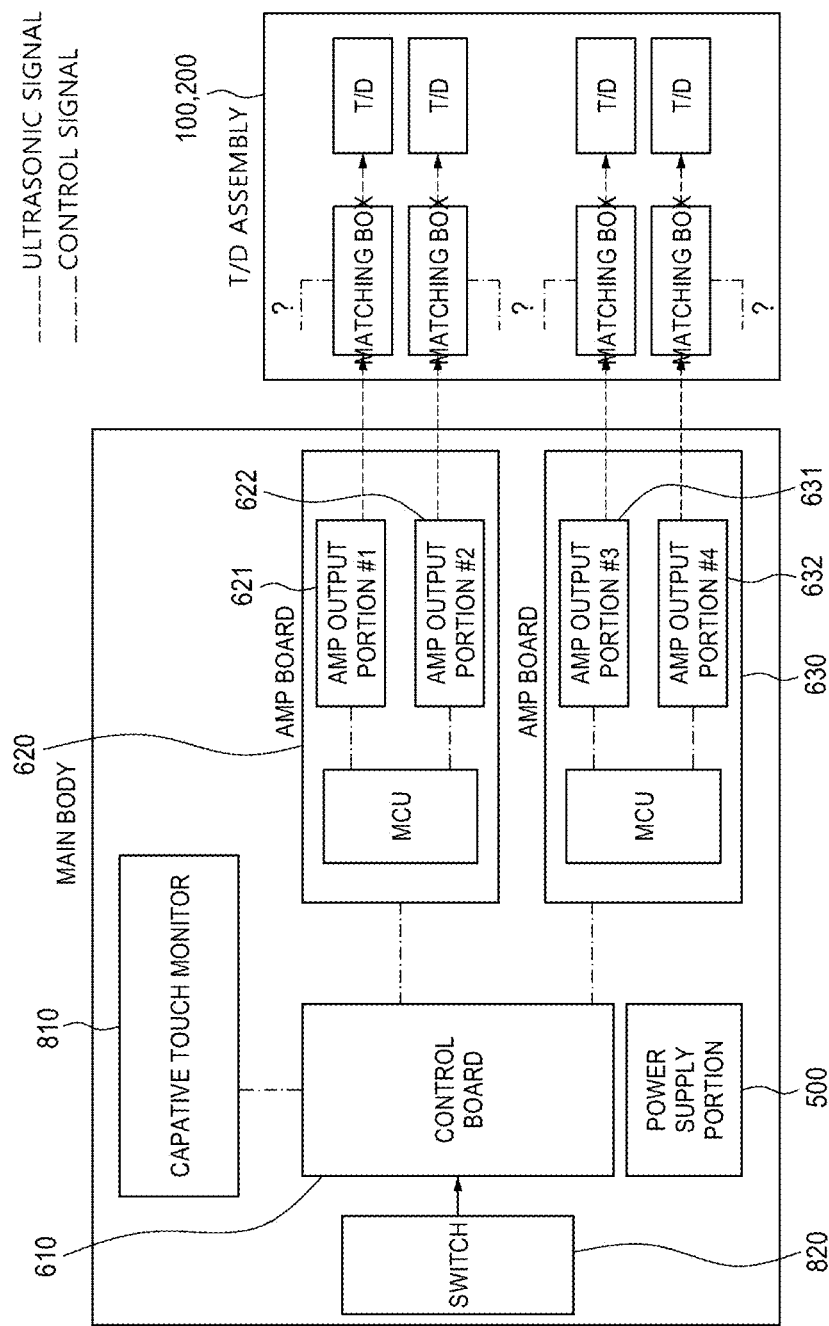
FIG. 8 shows an example of signaling connection of a device suggested in the present disclosure.

Further, FIG. 8 shows an example of signaling connection of a device suggested in the present disclosure.

Referring to FIG. 8, shown are a process of communication of control signals and process of generating ultrasound signals, in the output portion constituted with the power supply portion 500, the control portion 600, the display portion 700, the input portion 800 and the transducers 100, 200.

Transducer

FIG. 9 and FIGS. 10A-10C show an example of a transducer suggested in the present disclosure.

Figure 9:
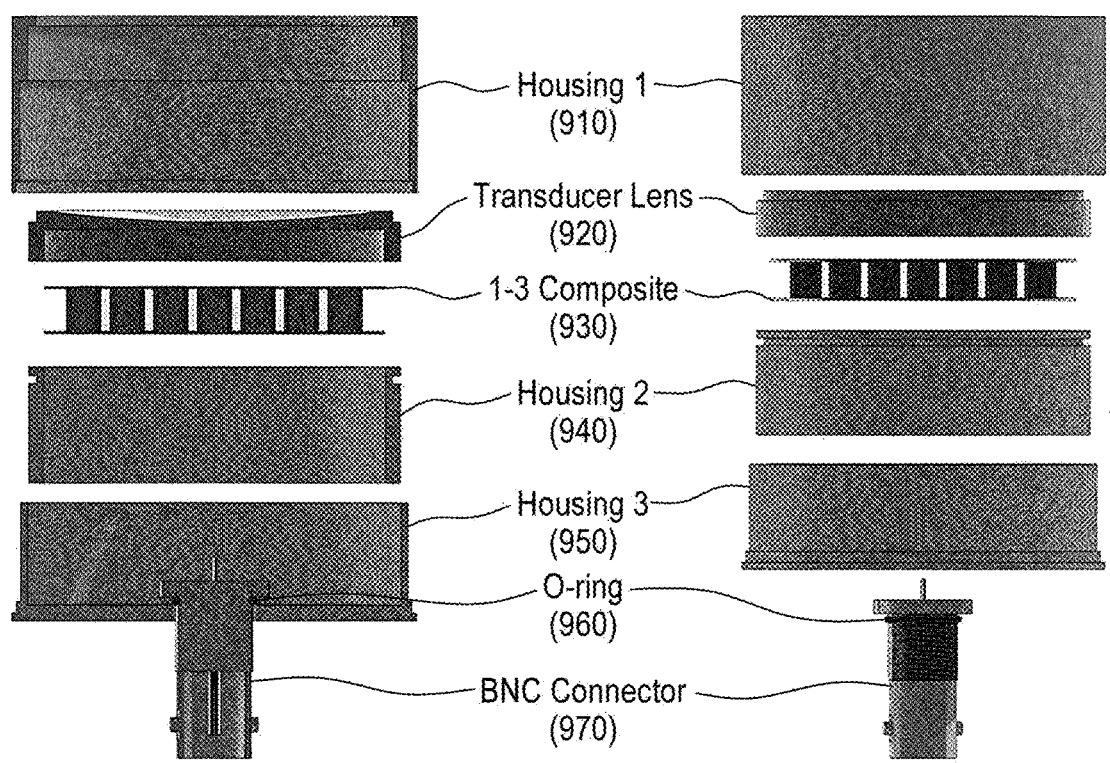
FIG. 9 and FIGS. 10A-10C show an example of a transducer suggested in the present disclosure.
Figure 10A:
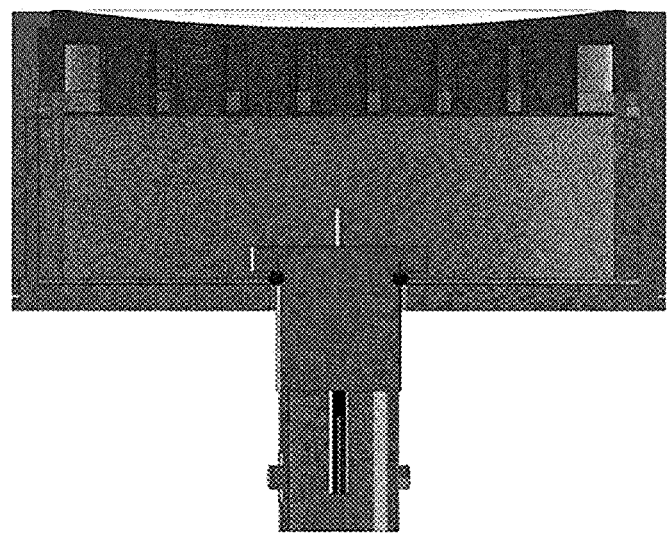
Figure 10B:
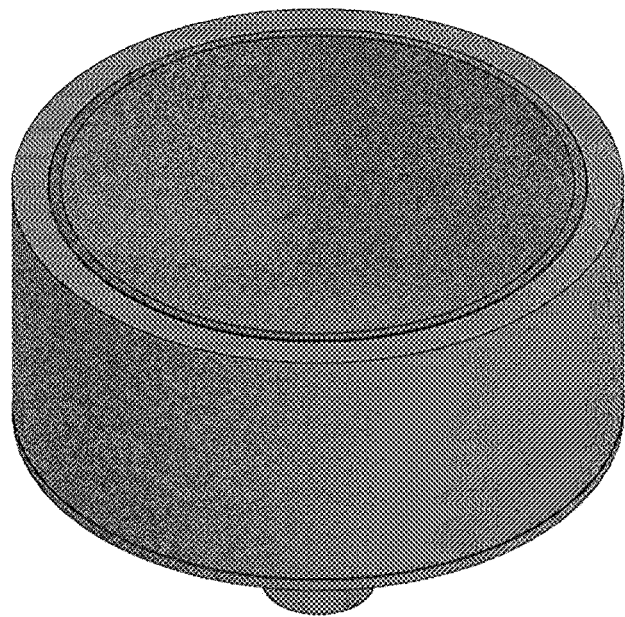
Figure 10C:
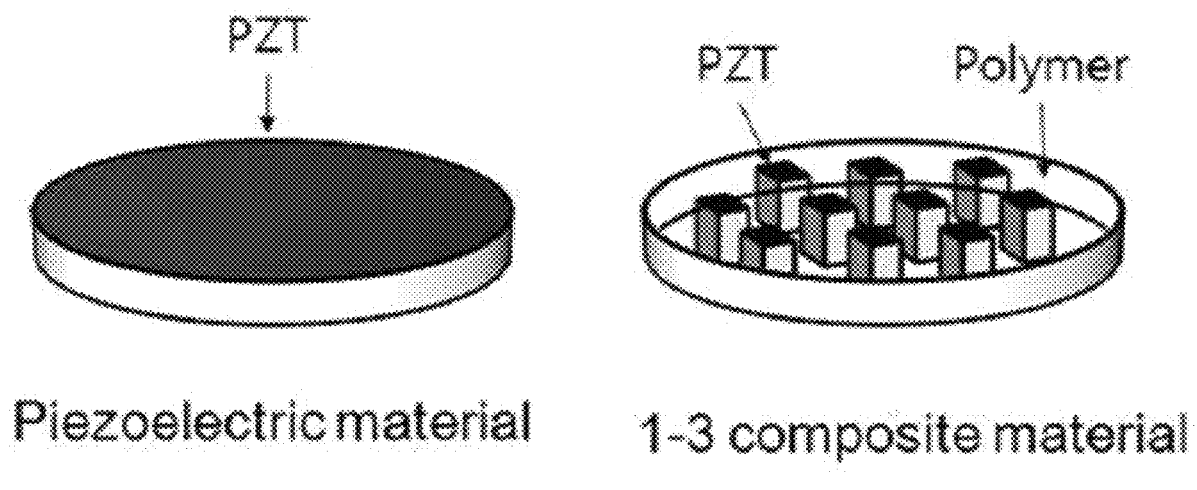

FIG. 9 shows an exemplary exploded transducer according to the present disclosure, and FIGS. 10A-10C shows a final transducer in which respective components are combined.

Referring to FIG. 9 and FIGS. 10A-10C, the transduces 100, 200 may include Housings 910, 940, 920, a Lens 920, an element 930, an O-ring 960 and a BNC connector 970.

Firstly, the housings 910, 940, 950 are made from PEEK material, and may have high hardness, high strength, thermal strain at a high temperature, lightweight, flame retardancy and suitability for use in humans.

Particularly, Housing 1 910 is a structure encompassing the PEI Lens 920 and the element 930, allowing protection against water due to superior combinability.

Further, the Housing 2 920 absorbs impact, protects the element 930 and provides a waterproof function.

Further, the Housing 3 950 has a superior assemblability with the Housing 1 910, allowing providing waterproof and dustproof functions (IPX 7 rating).

Next, Lens 920 is made from PEI material, and have high hardness, high strength, thermal strain at a high temperature, flame retardancy and suitability for use in humans.

Further, the Lens has a form processed for natural focusing at a short distance. Also, this may have a form processed for strong adhesion.

Further, the element is constituted of a 1-3 composite 930, secures efficiency in output of ultrasound, has lightweight and is capable of generating high power ultrasound.

The 1-3 composite 930 referred to as an element or an oscillator will be described in more detail taken in conjunction with FIG. 10C.

As shown in FIG. 10C, the element (oscillator) manufactured in an all-in-one type with a circular shape is implemented using Piezoelectric material. The 1-3 composite 930 is constituted of a plurality of Piezoelectric materials in an established form, and the perimeter thereof may be encompassed with a polymer.

(1) The 1-3 composite 930 is advantageous in securing an effective radiating area depending on the large bore diameter and is capable of generating ultrasound-negative pressure.
(2) The 1-3 composite 930 adopts a frequency of 250 KHz, resulting in easy transcranial passing.
(3) The 1-3 composite 930 allows implementing an ultrasound radiating diameter of ø (±20%) at natural focus zone.
(4) Further, the 1-3 composite 930 is capable of supporting multiple frequencies.

Further, the BNC 970 has easy assemblability, allowing protection of water and dust (IPX 7 rating).

Figure 11A:
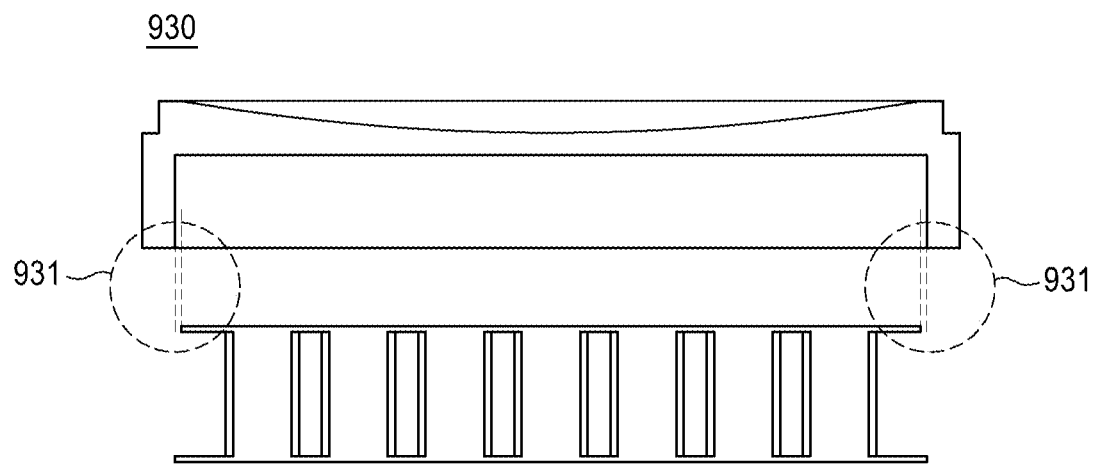
FIG. 11A and FIG. 11B show a diagram for explaining structural features of a 1-3 composite according to the present disclosure.
Figure 11B:
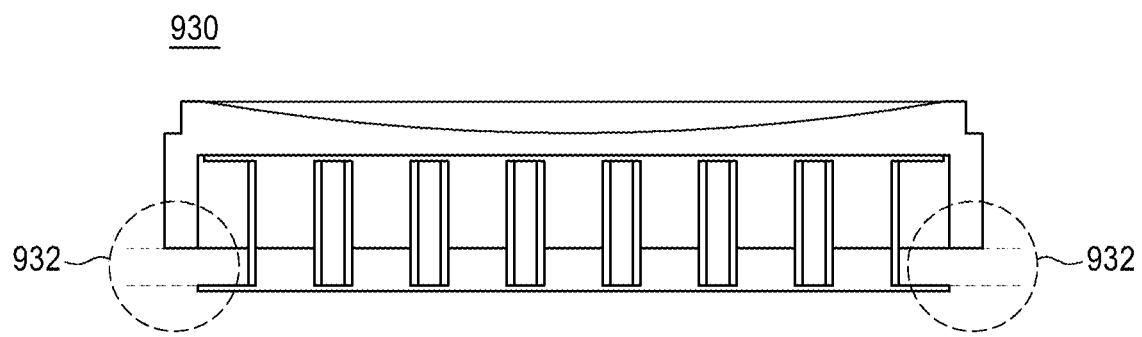

FIG. 11A and FIG. 11B show a diagram for explaining structural features of a 1-3 composite according to the present disclosure.

Referring to FIG. 11A, optimized tolerance, allowable difference between of a circular plate of the 1-3 composite 930 and the Lens 920 may secure efficiency in output of ultrasound.

Ultrasound is output as vibration waves by vibrations. Once the lens and the 1-3 composite have been adhered closely without any space between them, a negative pressure is not available to occur vibrations and cannot generate any vibration waves in desired directions.

Contrariwise, once the lens and the 1-3 composite have been adhered having a lot of space between them, a problem that generated ultrasound cannot be transmitted well may arise.

Therefore, according to the present disclosure, the aforementioned problem can be solved by forming each tolerance 931 as a space for generating vibrations at both sides of the 1-3 composite while maintaining ultrasound transmission.

Particularly, widths of a space inserted onto the lens and of the 1-3 composite 930 are same. Each tolerances are provided at both side respectively with reference to the diameter. The each tolerance provides a space for generating vibrations while maintaining ultrasound transmission until having a length of 0.3% or less of the diameter.

Further, referring to FIG. 11B, an optimized difference 932 in the length between the circular plate of the 1-3 composite 930 and the Lens 920 allows securing efficiency in output of ultrasound.

Further, as shown in FIG. 11B, the 1-3 composite 930 according to the present disclosure is adopted in a sandwich-type. When the sandwich-type element 930 is completely inserted into the bottom of the lens 920 up and down, resulting in a sandwiched phenomenon that vibrations are not generated constantly.

Therefore, in the present disclosure, the length of the 1-3 composite 930 is formed higher than that of an insertion region of the lens 920, and the height of the lens 920 is formed lower than that of the lens generally applied.

That is, as applying a height of the 1-3 composite allowing no event occurred in vibrating even when any one part of the 1-3 composite is not caught, in order to generate desired frequency and impedance during ultrasound radiation, the aforementioned structure is adopted to the present disclosure.

In the present disclosure, the length of the insertion region of the lens 920 is formed at least 30% smaller than the length of the 1-3 composite 930.

Function for Adjusting Time Parameters Minutely

Figure 12:
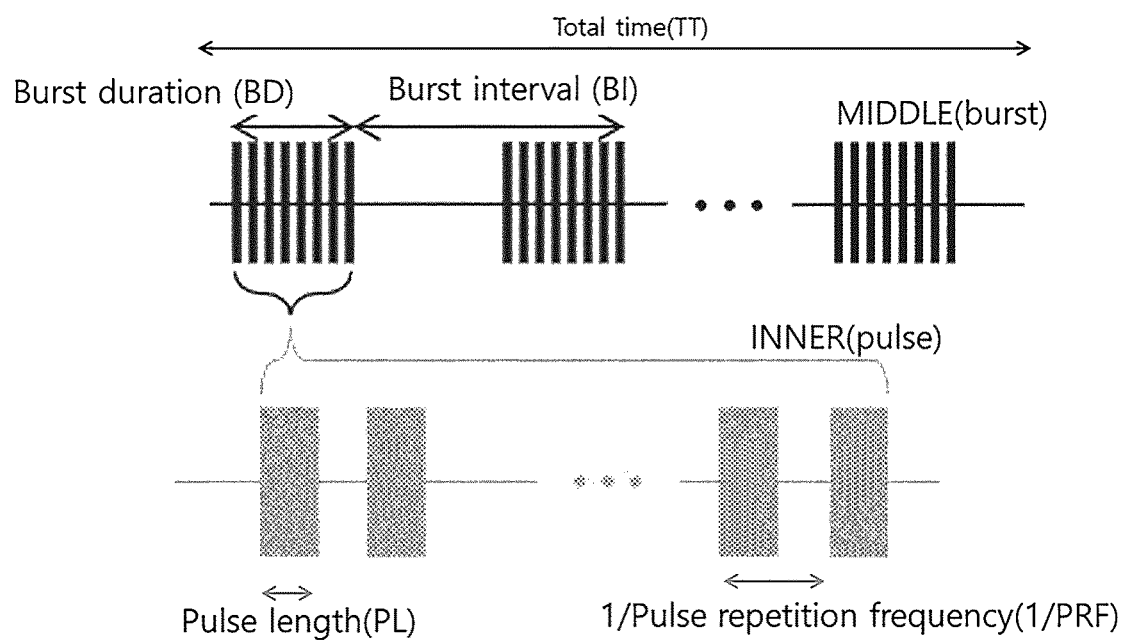
FIG. 12 shows a diagram for explaining an example in which time parameters are capable of being adjusted minutely according to the present disclosure.

FIG. 12 shows a diagram for explaining an example in which time parameters are capable of being adjusted minutely according to the present disclosure.

Referring to FIG. 12, the therapeutic effect may be maximized by controlling PL (Pulse Length), Duty, BD (Burst Duration), and BI (Burst Interval), etc.

Particularly, in respect of total time (TT), BD (Burst Duration) is applied in accordance with BI (Burst Interval) and Middle (burst) can be applied in the middle thereof.

Particularly, the BD (Burst Duration) is adjusted based on an inner pulse, which is controllable through the PL (Pulse Length). Whereby, a 1/pulse repetition frequency (1/PRF) can be drawn.

Configuration of High Power Hardware

According to the present disclosure, the maximum output of the RF AMP Boards 620, 630 inside the main body is 150 W. The output of the RF AMP Boards is adjustable, allowing obtaining desired output of ultrasound therefrom.

Further, according to the present disclosure, the output level is adjustable from 1 to 99, and this is a definite advantage as compared to prior devices.

Configuration of a Multi-Channel Transducer

According to the present disclosure, the multichannel transducer has a structure allowing connection of transducer assemblies 100, 200 of 1-channel/2-channel/4-channel.

Referring to FIG. 8, when using one channel, the transducer is connected to an AMP output portion #1 621. When using two channels, the transducer is connected to AMP output portion #1 621 and AMP output portion #3 631.

Further, when using four channels, the transducer is connected to AMP output portions #1/#2/#3/#4 621, 622, 631, 632.

Meanwhile, when turning on the device, it is allowable to check a connection state of the transducer assembly and basic information of the transducer (output frequency, hours (times) of use).

That is, prior to starting the treatment, connection states of the channels through which signals are output according to operation commands are checked. Then, when any of the channels to be operated is not in connection, a warning sign may be displayed.

Function for Supporting Multiple Frequencies

According to the present disclosure, as changing the transducer assembly, a frequency to be use may be changeable.

Referring to FIG. 8, output frequency of the transducer is confirmed by identifying the information from matching boxes in the transducer assembly.

Then, signal power of the confirmed frequency may be transmitted to the transducer.

Particularly, when turning on the device, it is allowable to check a connection state of the transducer assembly and basic information of the transducer (output frequency, hours (times) of use).

Further, the output frequency recorded in the transducer assembly is output from the AMP board and may be transmitted to the transducer.

Control and Display Methods

Figure 13A:

FIG. 13A and FIG. 13B, in accordance with the present disclosure, show a particular example in which a multi-channel transducer is controlled through multi-frequency.

Referring to FIG. 13A and FIG. 13B, 13 pieces of information and controllable factors are displayed.

Firstly, No. 1 is a Frequency UI (User Interface) showing an ultrasound frequency and is unchangeable by the user.

Next, No. 2 is a PL UI showing turn-on time of an inner pulse of an ultrasound generating signal.

Wherein, Min. is changed by 0.1 within a range of 0.1 ms to 1 ms while Max. is changed by 1 within a range of 1 ms to 1000 ms. An error range may be ±5%.

Further, No. 3 is a Duty Cycle UI showing a period ratio according to the turn-on time of an inner pulse of the ultrasound generating signal.

Wherein, Min, is changed by 0.1 within a range of 0.1% to 1%, while Max. is changed by 1% within a range of 1% to 100%. An error range may be ±5%.

Further, No. 4 a BD UI showing turn-on time of an outer pulse of the ultrasound generating signal, wherein Min. is 10 ms and Max. is 3000 ms which are changed by 1 and an error range may be ±5%.

Further, No. 6 is a Total Time UI, capable of adjusting the total time of operation. Wherein, times of use is adjustable by using +, – buttons (by 1 within a range of 1min to 30 min), and an error range may be ±5%.

Further, No. 7 is a Power UI, capable of adjusting (RF board) output levels of the device, wherein the level is adjustable by using Δ, ∇ buttons (within a range of 1 to 85) and an error range may be ±5%.

Further, No. 8 is a Memory UI capable of storing respective parameter in preset states (M1, M2, M3, M4).

Further, No. 9 is a Start/Stop UI providing a button for starting/stopping ultrasound radiation (no pause button provided).

Further, No. 10 is an Intensity UI capable of adjusting output (W) and effective intensity (W/cm$^2$) of ultrasound, wherein each error range thereof is ±20% (output) and ±30% (effective intensity), respectively.

Further, No. 11 is an Information UI showing detailed information of the device.

Further, No. 12 is a Handpiece UI displaying a handpiece connection and connections between transducer modules.

Further, No. 13 is a CH-Status UI allowing determining output forms of ultrasound.

Meanwhile, the above-described embodiments of the present disclosure may be implemented through various ways. For example, the embodiments of the present disclosure may be implemented by hardware, firmware, software or a combination thereof.

In a case of the implementation by hardware, a method according to the present disclosure may be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, and microprocessors, etc.

In a case of the implementation by either firmware or software, a method according to the present disclosure may be implemented in forms of modules, processes, or functions, etc. for performing the aforementioned functions or operations. Software codes are stored in a memory unit and may be operated by a processor. The memory unit is positioned the inside or outside of the processor, and receives and transmits data from and to the processor by known means.

As mentioned above, the detailed description for the disclosed preferable embodiments of the present disclosure was provided in order to be easily implemented by those skilled in the art. In the above, the preferable embodiments of the present disclosure were explained with reference to the accompanying drawings, it will apparent for those skilled in the art that various changes and modification are allowable within the scope of the present disclosure. For example, those skilled in the art are able to use the respective configurations described in the aforementioned embodiments in a way of combining the same with each other. Thus, the present disclosure is not limited to the embodiments shown in this application, but granting the widest scope coinciding with principals and novel features disclosed herein.

The present disclosure may be rectified to different specific forms within the scope of the spirit and essential features. Thus, the above detailed description should not be understood limitedly in all aspects but should be considered as examples. The scope of the present disclosure should be determined by interpreting accompanying claims rationally, and includes all modifications within the equivalent scope of the present disclosure. The present disclosure is not limited to the embodiments shown in this application, but granting the widest scope coinciding with principals and novel features disclosed herein. Further, the present disclosure may configure embodiments by combining claims which are not in explicit citation relationship in the patent scope or may include new claims through amendments following filing this application.

The invention claimed is:

1. A transducer comprising:
an oscillator including a plurality of Piezoelectric materials and a polymer encompassing the plurality of Piezoelectric materials, and irradiating an ultrasound using at least one of the plurality of Piezoelectric materials and the polymer;
a lens having a first space recessed from one surface of the lens for at least a part of the oscillator to be inserted therein, and configured to focus the applied ultrasound; and
a housing encompassing the oscillator and the lens such that the oscillator and the lens are coupled inside the housing, wherein a height of the oscillator in an insertion direction is longer than a height of the first space into which the oscillator is inserted, a first height difference between the height of the oscillator and the height of the first space is inversely proportional to an overall height of the lens, and a width of the oscillator is smaller than a width of the first space.

2. The transducer of claim 1, wherein the first height difference is a length within 30% of the overall height of the lens, and the width of the oscillator is smaller than the width of the first space by within 0.6% of the width of the first space.

3. The transducer of claim 2, wherein the housing further comprises:

a first housing of a structure encompassing the lens and an oscillator area where the oscillator is inserted into the first space of the lens;

a second housing of a structure encompassing the lens and an oscillator area including a portion of the oscillator not inserted into the first space of the lens; and a third housing encompassing the second housing and combined with the first housing, wherein at least a part of the third housing comprises a connector for external connection.

4. An ultrasound device for facilitating waste clearance of the brain lymphatic system, the ultrasound device comprising:

a frequency-generator generating a predetermined frequency;

a waveform modulator modulating a waveform of the frequency;

a linear amplifier amplifying the waveform;

a resonance circuit portion matching impedance of the amplified waveform; and a transducer according to claim 1, the transducer being coupled to the resonance circuit portion and irradiating an ultrasound toward the brain of mammals, wherein the ultrasound facilitates waste clearance of the brain lymphatic system.

5. The ultrasound device of claim 4, wherein the transducer comprises a plurality of transducers, and the ultrasound device generates pulses using output of at least a part of the plurality of the transducers, and changes Pulse Length (PL), that is, a length of each of the pulses, Burst Duration (BD) of each of bursts where the pulses are formed and a Burst Interval (BI) between the bursts by controlling operations of the plurality of the transducers.

6. The ultrasound device of claim 5, wherein a maximum output of a plurality of linear amplifiers associated with the plurality of the transducers is optionally adjusted, allowing controlling a final output of the ultrasound irradiated toward the brain of mammals.

7. The ultrasound device of claim 6, wherein the number of the plurality of transducers is four, and the plurality of the linear amplifiers includes a 1-1 linear amplifier coupled to both a 1-1 transducer and a 1-2 transducer among the four transducers, and a 1-2 linear amplifier coupled to both a 1-3 transducer and a 1-4 transducer among the four transducers.

8. The ultrasound device of claim 7, wherein the ultrasound device for facilitating waste clearance of the brain lymphatic system is capable of supporting multiple channels, when using one channel among the multiple channels, the 1-1 transducer is connected with the 1-1 linear amplifier, followed by being operated, when using two channels among the multiple channels, the 1-1 transducer is connected with the 1-1 linear amplifier while connecting the 1-3 transducer with the 1-2 linear amplifier, followed by being operated, when using four channels among the multiple channels, the 1-1 transducer and the 1-2 transducer are connected with the 1-1 linear amplifier while connecting the 1-3 transducer and the 1-4 transducer with the 1-2 linear amplifier, followed by being operated.

9. The ultrasound device of claim 8, wherein a plurality of matching confirmation portions is provided between the plurality of the transducers and the plurality of the linear amplifiers; and the plurality of the matching confirmation portions confirms an output frequency of the ultrasound irradiated through the plurality of the transducers based on signal information received from the plurality of the linear amplifiers.

10. The ultrasound device for facilitating waste clearance of the brain lymphatic system of claim 9, wherein at least a part of each of the plurality of the transducers is detachable or attachable, and a frequency of the ultrasound irradiated toward the brain of mammals is changeable according to whether the at least the part of each of the plurality of transducers is detached or attached.

11. The ultrasound device of claim 10, wherein the plurality of the transducers are positioned along a circumference of the brain to face mutually with each other, and are aligned so as to irradiate the ultrasound toward deep areas of the brain.

12. The ultrasound device of claim 11, further comprising:

a head gear configured to fix the plurality of the transducers, wherein the plurality of the transducers irradiate the ultrasound sequentially.

13. The ultrasound device of claim 12, further comprising:

a coupling gel configured to acoustically couple at least a part of the plurality of the transducers to the skin of mammals.

14. The ultrasound device of claim 13, wherein in the ultrasound to be irradiated toward the brain of mammals, a band of a pulse waveform ranges from 100 KHz to 800 KHz, a tone burst duration (D) ranges from 1 ms to 500 ms, and a duty cycle ranges from 0.3 to 70%.

* * * * *